United States Patent [19]
Wenderoth

[11] 3,722,633
[45] Mar. 27, 1973

[54] CARRIAGE BRAKE DEVICE

[75] Inventor: Karl Wenderoth, Hohenweg 31, Germany

[73] Assignee: Adlerwerke vorm. Heinrich Kleyer A.G., Frankfurt, Germany

[22] Filed: May 10, 1971

[21] Appl. No.: 141,651

[30] Foreign Application Priority Data

Dec. 19, 1970   Germany............................P 20 62 755.8

[52] U.S. Cl. ........................188/68, 188/75, 188/77, 188/83, 197/64
[51] Int. Cl. .............................................F16d 63/00
[58] Field of Search .........188/68, 75, 77, 83; 197/64

[56] References Cited

UNITED STATES PATENTS

| | | | |
|---|---|---|---|
| 2,129,650 | 9/1938 | Crumrine | 197/64 |
| 3,402,692 | 9/1968 | Hickman et al. | 188/77 X |
| 919,020 | 4/1909 | Josleyn | 197/64 |

*Primary Examiner*—George E. A. Halvosa
*Attorney*—Joseph R. Spalla

[57] ABSTRACT

A U-shaped slip ring frictionally engages a boss on an escapement wheel to decelerate a freed carriage before it strikes a stopping abutment. The spring normally rotates with the escapement wheel. However, when the carriage is freed, the spring is held stationary and exerts a braking force on the escapement wheel.

4 Claims, 2 Drawing Figures

INVENTOR
KARL WENDEROTH

BY Joseph R. Spalla
ATTORNEY

CARRIAGE BRAKE DEVICE

BACKGROUND OF THE INVENTION

The invention pertains to a brake for decelerating the carriage of a typewriter or similar machine. The brake is easily adjusted to set the braking force and comprises a two armed slip spring which embraces and grips a boss of the escapement wheel.

When tabulating with a typewriter, it is necessary to decelerate the freed paper supporting carriage so that the carriage will not strike the stopping abutment of the tabulating device with full force. Air brakes and friction brakes such as shoe, band disk brakes, etc., are used to impede the motion of the freed carriage.

Disk brakes are usually laminated. These laminations are accommodated in a housing and are placed under pressure by an axially effective spring. The frequently required changes in the braking force are effected by an axial shift of the disk, by changing the number of laminations or by substituting different laminations. (See German Pats. Nos. 643,001 and 503,208.)

Band brakes employ a flexible brake band which is looped around a brake drum that is integral with the escapement wheel. The braking force of the band can be adjusted by a slide which can be positioned to tighten the band. Such adjusting devices are expensive to produce, can become unadjusted during use, and require added effort incidental to freeing the carriage.

To prevent noises during operation of the escapement wheel, typewriters have also been provided with retarders which serve to control the motion of the escapement tooth and thereby dampen the shock attendant to each carriage step. In relatively complicated devices of this kind, slip springs have been used which are in frictional contact with and exert a braking force on the escapement wheel shaft or another related part of the escapement device.

One object of the present invention is to provide a tabulation braking device which is economical to produce and has brake elements which experience little wear. A further object is to have a device in which the braking force can be conveniently set.

SUMMARY OF THE INVENTION

The device for decelerating the paper supporting carriage includes a boss of the escapement wheel which forms one braking element and a two armed slip spring which embraces the boss and forms the other braking element. A toothed brake disk is carried by and coaxial with respect to the boss. The brake disk carries the slip spring and normally rotates with the escapement wheel. However, the disk is blocked against rotation when the carriage is freed to effect the braking.

The slip spring has the end of one arm anchored in the brake disk while the end of the other arm is free for limited movement. A setting ring is also carried by and coaxial with respect to the boss. The setting ring can be rotated to a limited extent relative to the brake disk to move the free end of the spring and thereby adjust the braking force of the spring on the boss. In order to hold the setting ring in the set position, a tooth on the ring cooperates with locating notches in the brake disk.

In a further embodiment of the invention, the boss on the escapement wheel, which serves as one of the braking elements, is provided with an annular groove that receives the arms of the slip spring.

An advantage of the present invention is that despite the small diameter of the boss which serves as one of the brake elements and the small dimensions of the entire device, a great braking force is generated which can be easily varied over a wide range through the setting ring. Furthermore, the braking device has very few parts and is relatively simple in construction.

The numerous objects and advantages of the present invention will become more apparent from the following detailed description and the accompanying drawings of a preferred embodiment of the invention.

DESCRIPTION OF A PREFERRED EMBODIMENT OF THE INVENTION

Figure 1:
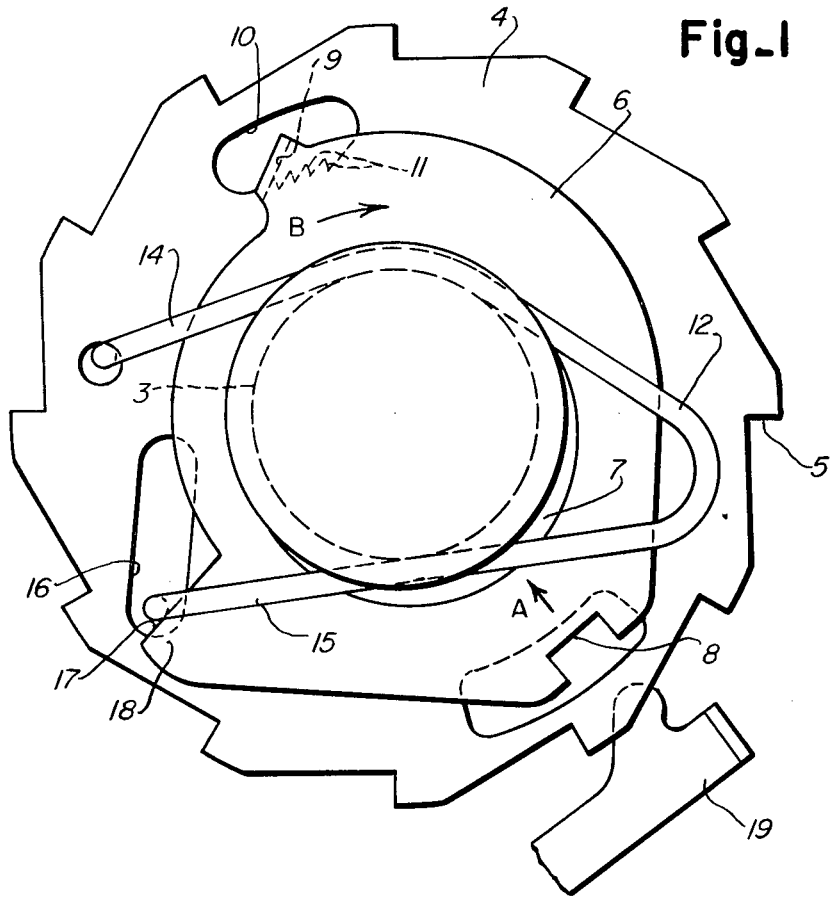
FIG. 1 is a rear view of the braking device.
Figure 2:
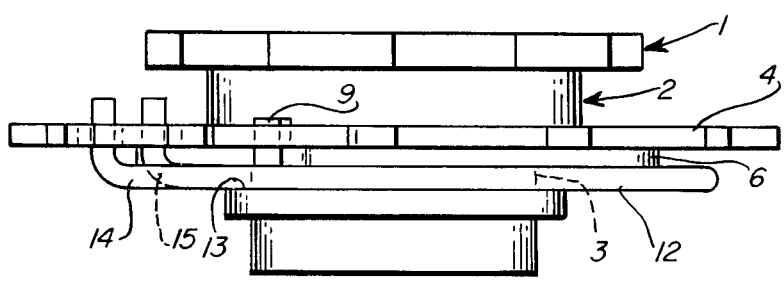
FIG. 2 is a top view of the braking device.

The escapement wheel 1 has a boss 2 thereon. The extension 3 of boss 2 serves as a braking element. Extension 3 carries a brake disk 4, having peripheral teeth 5, and a setting ring 6 which is superimposed on the brake disk 4. Disk 4 and ring 6 are coaxial with respect to the extension 3 and can rotate relative to the extension.

The interior opening of the setting ring 6 which accommodates extension 3 of the escapement wheel, is elongated to form a space 7 between the edge of the opening and the extension or braking element 3. A notch 8 is located in the outer periphery of the setting ring 6 in line with the elongated axis of the opening and adjacent the space 7. At the opposite end of the setting ring 6 is an angularly bent tooth 9. This tooth is located on the outer periphery of the ring 6 in line with the elongated axis of the opening. This tooth 9 extends into a kidney-shaped aperture 10 of the brake disk 4. The aperture 10 is provided at the inner edge with notches 11 for receiving tooth 9.

A U-shaped wire slip spring 12 overlays the brake disk 4 and the setting ring 6. The slip spring 12 is slidably received in a ring groove 13 of brake element 3 and grips the brake element 3 to effect the braking action. The slip spring 12 also serves as a retainer for the brake disk 4 and the setting ring 6.

One arm 14 of the slip spring 12 has its end extending at right angles from the arm through a hole in the brake disk 4 thereby anchoring this end of the spring. The end of the other spring arm 15 extends at right angles from the arm into a slot 16 of the brake disk 4 whereby the end of the spring is free to move within the slot and bears against the radially extending edge 17 of setting ring projection 18.

Lever 19, which is a portion of an undescribed tabulating linkage, blocks the rotation of the braking disk 4 upon tabulation.

OPERATION

During normal typing, the brake disk 4 and the setting ring 6 are frictionally coupled to the braking element 3 through spring 12 and rotate along with braking element 3.

Through operation of the tabulator key (not shown), the carriage is freed and concurrently the lever 19 is rotated into engagement with teeth 5 of the brake disk 4. This blocks the rotation of the brake disk 4 as well as that of the setting ring 6 and the slip spring 12 which are interlocked with the brake disk 4. However, the escapement wheel 1 along with the boss 2 and its braking element 3 continue to rotate. Thus the spring 12 which frictionally engages braking element 3 exerts a braking force on the element and consequently the escapement wheel.

When the braking force exerted by the spring 12 on the braking element 3 needs adjusting, the adjustment is effected by rotating the setting ring 6. When the setting ring is rotated, the end of spring arm 15 is shifted in the slot 16 by edge 17 of the ring projection thereby changing the degree of force with which the braking element 3 is gripped by the spring 12.

The setting ring is shifted by means of a screwdriver which is first inserted into notch 8 to shift the setting ring in the direction of arrow A, a distance equal to the width of space 7. This unseats the tooth 9 of the setting ring 6 so that the ring can be turned. The ring 6 is then turned by means of the inserted screwdriver to the desired setting. As shown in FIG. 1, by turning the ring 6 in the direction of arrow B and allowing the tooth 9 to settle into another notch, the spring is put under greater tension. This is accomplished by edge 17 of projection 18 which forces the end of spring arm 15 closer to spring arm 14 thereby increasing the tension in the spring and the frictional engagement between the spring 12 and the brake element 3.

The invention claimed is:

1. A device for braking a paper supporting carriage on typewriters and the like comprising:

an escapement wheel, said escapement wheel having a boss thereon which acts as a first braking element;

a second braking element, said second braking element being a slip spring having first and second arms which engage a surface of said first braking element;

a brake disk rotatably carried on said boss, said brake disk having said slip spring mounted thereon with an end of said first arm affixed to said brake disk and with a free end of said second arm slidably retained in a slot of said brake disk, said brake disk having teeth thereon for cooperating with means to block rotation of said brake disk and said slip spring to effect the braking of the escapement wheel; and a setting ring rotatably carried on said boss, said setting ring being capable of limited rotation relative to said brake disk, said setting ring having means contracting said free end of said second slip spring arm to effect move-ment of said second arm relative to said first arm to adjust the braking force of said slip spring on said boss.

2. In the device of claim 1:
said brake disk having notches therein, and
said setting ring having a tooth thereon for engaging said notches to retain said setting ring in a fixed position relative to said brake disk once said slip spring has been adjusted.

3. In the device of claim 2:
said setting ring having an elongated aperture therein which receives said boss whereby said setting ring can be shifted radially relative to said boss and said brake disk, and said setting ring having means adapted to be engaged by a tool to shift said setting ring to disengage said setting ring tooth from said notches of said brake disk so that said setting ring can be rotated relative to said brake disk.

4. In the device of claim 2:
said boss having an annular groove therein, and
said arms of said slip spring having portions thereof received within said annular groove.

* * * * *